(12) United States Patent
Parasuram et al.

(10) Patent No.: US 11,760,354 B2
(45) Date of Patent: *Sep. 19, 2023

(54) MULTI-WAY STOP INTERSECTION PRECEDENCE FOR AUTONOMOUS VEHICLES

(71) Applicant: Waymo LLC, Mountain View, CA (US)

(72) Inventors: Aishwarya Parasuram, Sunnyvale, CA (US); Brandon Luders, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 98 days.

This patent is subject to a terminal disclaimer.

(21) Appl. No.: 17/330,736

(22) Filed: May 26, 2021

(65) Prior Publication Data
US 2021/0339747 A1 Nov. 4, 2021

Related U.S. Application Data

(63) Continuation of application No. 16/427,520, filed on May 31, 2019, now Pat. No. 11,046,317.

(51) Int. Cl.
*B60W 30/18* (2012.01)
*B60W 30/095* (2012.01)
(Continued)

(52) U.S. Cl.
CPC .. *B60W 30/18154* (2013.01); *B60W 30/0956* (2013.01); *G06V 20/584* (2022.01);
(Continued)

(58) Field of Classification Search
CPC ....... B60W 30/18154; B60W 30/0956; B60W 2554/4041; B60W 2554/804; G06V 20/584
See application file for complete search history.

(56) References Cited

U.S. PATENT DOCUMENTS 9,459,623 B1 * 10/2016 Raghu ................... G01S 13/931
9,528,838 B2 12/2016 Okumura
(Continued)

FOREIGN PATENT DOCUMENTS

GB 2510698 A 8/2014

OTHER PUBLICATIONS

Cokely, K, "More Crashes at Intersections With Flashing Lights", Dec. 19, 2011 (Year: 2011).

*Primary Examiner* — Faris S Almatrahi
*Assistant Examiner* — Sahar Motazedi
(74) *Attorney, Agent, or Firm* — Botus Churchill IP Law LLP

(57) ABSTRACT

Aspects of the disclosure relate to a method of controlling a vehicle having an autonomous driving mode at a multi-way stop intersection. For instance, that the vehicle has come to a stop at a multi-stop intersection may be determined. At least one road user at the intersection may be identified. Based on the determination that the vehicle has come to the stop, a period of time to wait for the at least one road user to proceed through the intersection may be determined. After waiting the determined period of time, that the at least one road user has not begun to proceed through the intersection may be determined. Based on the determination that the at least one user has not begun to proceed through the intersection, the vehicle may be controlled in the autonomous driving mode in order to proceed through the intersection.

20 Claims, 5 Drawing Sheets

(51) Int. Cl.
*G06K 9/00* (2022.01)
*G06V 20/58* (2022.01)
(52) U.S. Cl.
CPC ............... *B60W 2554/4041* (2020.02); *B60W 2554/804* (2020.02)

(56) References Cited

U.S. PATENT DOCUMENTS

| | | |
|---|---|---|
| 9,818,299 B1 | 11/2017 | Jammoussi et al. |
| 10,173,675 B2 | 1/2019 | Lopez et al. |
| 10,202,118 B2 | 2/2019 | Russell et al. |
| 2017/0057514 A1 | 3/2017 | Toyoda et al. |
| 2017/0249836 A1 | 8/2017 | Laur et al. |
| 2019/0088148 A1 | 3/2019 | Jacobus et al. |
| 2019/0384302 A1 | 12/2019 | Silva et al. |
| 2020/0307630 A1 | 10/2020 | Ueda et al. |

\* cited by examiner

MULTI-WAY STOP INTERSECTION PRECEDENCE FOR AUTONOMOUS VEHICLES

CROSS REFERENCE TO RELATED APPLICATIONS

The present application is a continuation of U.S. patent application Ser. No. 16/427,520, filed May 31, 2019, the disclosure of which is incorporated herein by reference.

BACKGROUND

Autonomous vehicles, such as vehicles that do not require a human driver, can be used to aid in the transport of passengers or items from one location to another. Such vehicles may operate in a fully autonomous mode where users may provide some initial input, such as a pickup or destination location, and the vehicle maneuvers itself to that location.

For safety and other reasons, autonomous vehicles may be programmed to drive more cautiously than a typical human driver. While this may improve safety for the vehicle, the vehicle's passengers, and other road users (such as vehicles, bicycles, pedestrians, etc.), in certain situations, cautious behaviors may result in the vehicle waiting too long to proceed, inconveniencing other road users, or simply not making progress (i.e. getting stuck). This may be especially true at multi-way stop intersections, such as two-way or four-way stop intersections. For example, at a four-way stop intersection controlled by stop signs and/or flashing lights, an autonomous vehicle's cautious behaviors may end up causing the vehicle to wait at a stop sign for another road user (stopped for a different stop sign at the intersection) who has precedence (i.e. got there first) to proceed who is not paying attention or not ready or able to proceed.

BRIEF SUMMARY

One aspect of the disclosure provides a method of controlling a vehicle having an autonomous driving mode at a multi-way stop intersection. The method includes determining, by one or more processors of one or more computing devices, that the vehicle has come to a stop at a multi-stop intersection; identifying, by the one or more processors, at least one road user at the intersection; based on the determination that the vehicle has come to the stop, determining, by the one or more processors, a period of time to wait for the at least one road user to proceed through the intersection; waiting, by the one or more processors, the determined period of time; after waiting, by the one or more processors, the determined period of time, determining that the at least one road user has not begun to proceed through the intersection; and based on the determination that the at least one user has not begun to proceed through the intersection, controlling, by the one or more processors, the vehicle in the autonomous driving mode in order to proceed through the intersection.

In one example, after determining that the vehicle has come to the stop and before determining the determined period of time, waiting a predetermined period of time. In another example, determining that the vehicle has come to a stop includes determining that there is no other road user between the vehicle and a stop line or control point for the lane in which the vehicle is currently traveling. In another example, determining that the vehicle has come to the stop includes determining that there is no other road user between the vehicle and a start of the intersection. In another example, determining that the vehicle has come to the stop includes determining that the vehicle is moving at a speed of less than 0.1 meters per second relative to the ground. In another example, the method also includes identifying the at least one road user as a road user with precedence relative to the vehicle at the intersection. In this example, identifying the at least one road user as a road user with precedence includes determining that the at least one road user has arrived immediately before the vehicle at the intersection or within at least a predetermined period of time as an arrival of the vehicle at the intersection. In addition or alternatively, when there are multiple road users at the intersection, identifying the at least one road user as the road user with precedence is based on arrival times of the multiple road users at the intersection. In another example, determining the determined period of time is based on whether the at least one road user is blocked by another road user. In another example, determining the determined period of time is based on arrival times for the vehicle and the at least one road user at the intersection. In another example, determining the determined period of time is based on whether the road user is located to the right of the vehicle. In this example, the determined period of time is shorter when the road user is located to the immediate left of the vehicle than when the road user is not located to the immediate left of the vehicle. In another example, the at least one road user has begun to proceed through the intersection while the vehicle is waiting the determined period of time, controlling the vehicle in the autonomous driving mode in order to proceed through the intersection regardless of whether the vehicle has waited the determined period of time. In another example, the method also includes, after waiting the predetermined period of time and determining that the at least one road user has not begun to proceed through the intersection, determining whether the vehicle is able to perceive the at least one road user before controlling the vehicle. In this example, determining whether the vehicle is able to perceive the at least one road user is based on whether a polygon corresponding to a location proximate to the intersection is at least partially occluded. In addition, the polygon is occluded when a predetermined number of sides of the polygon are not perceived by the vehicle. In addition or alternatively, when it is determined that the vehicle is not able to perceive the at least one road user, waiting an additional period of time before controlling the vehicle. In this example, the method also includes determining the additional period of time based on whether the intersection is controlled by stop signs. Alternatively, the method also includes determining the additional period of time based on whether the intersection is controlled by a flashing traffic light. In addition or alternatively, determining the additional period of time to be a first period of time when the intersection is controlled by stop signs and a second period of time when the intersection is controlled by a flashing traffic light, and wherein the second period of time is longer than the first period of time.

DETAILED DESCRIPTION

Overview

Figure 1:
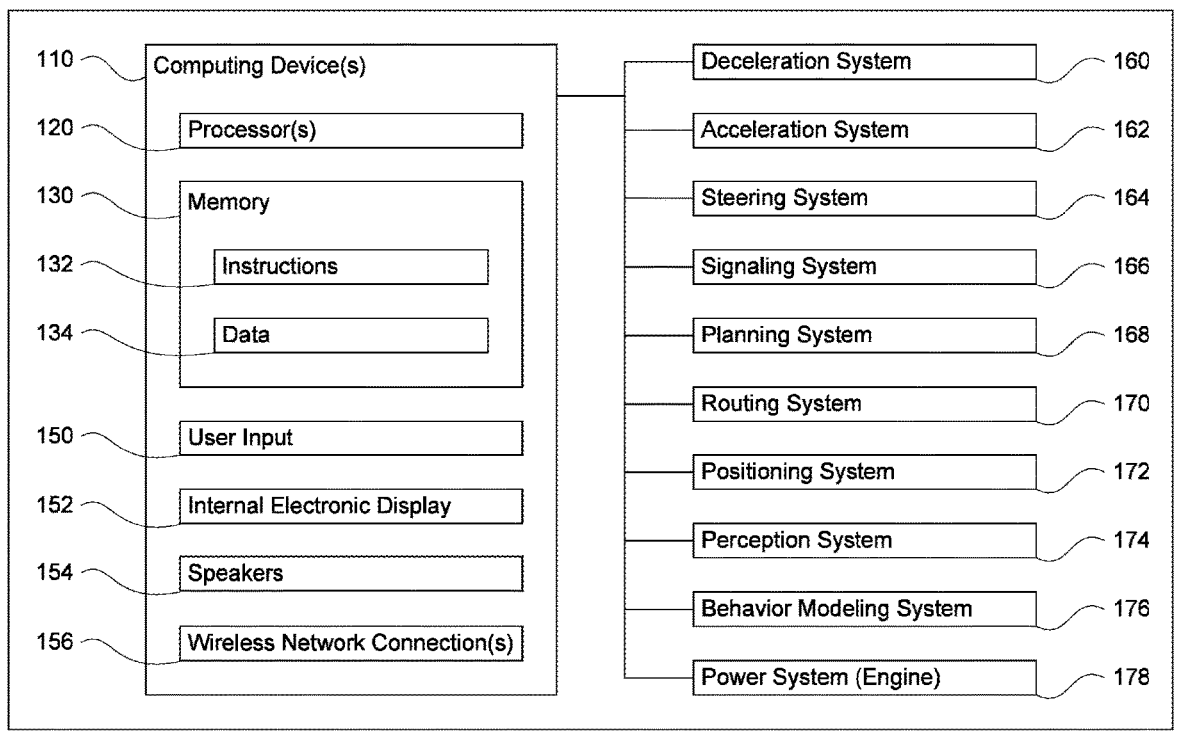
FIG. 1 is a functional diagram of an example vehicle in accordance with an exemplary embodiment.

The technology relates to automating precedence logic for autonomous vehicles. As noted above, autonomous vehicles may be programmed to drive more cautiously than a typical human driver. While this may improve safety for the vehicle, the vehicle's passengers, and other road users, in certain situations, cautious behaviors may result in the vehicle waiting too long to proceed, inconveniencing other road users, or simply not making progress (i.e. getting stuck). This may be especially true at multi-way stop intersections, such as two-way or four-way stop intersections. For example, at a four-way stop intersection controlled by stop signs and/or flashing lights, an autonomous vehicle's cautious behaviors may end up causing the vehicle to wait at a stop sign for another road user (stopped for a different stop sign at the intersection) who has precedence (i.e. got there first) to proceed who is not paying attention or not ready or able to proceed. To address this, the autonomous vehicle may be programmed with multi-way stop intersection precedence logic to assert itself in certain circumstances.

Before initiating multi-way stop intersection precedence logic, a vehicle's computing devices may first determine when the vehicle has come to a stop for a stop sign at a multi-stop intersection. This may be determined, for instance, by identifying information for intersections stored in the vehicle's map information and by determining that the vehicle has come to a stop proximate to the intersection.

Once stopped, the vehicle's computing devices may wait a predetermined period of time before initiating the multi-way stop intersection precedence logic. After the predetermined period of time, if there are no other stopped vehicles at the intersection, the multi-way stop intersection precedence logic may indicate that the vehicle has precedence, and the vehicle's computing devices may cause the vehicle to proceed through the intersection.

If there are one or more other vehicle stopped at the intersection, the multi-way stop intersection precedence logic may cause the vehicle's computing devices to identify the road user with precedence or rather, the road user that has precedence at the intersection at the same time or immediately before the vehicle. Once the road user with precedence is identified, the multi-way stop intersection precedence logic may cause vehicle's computing devices to determine a period of time for how long the vehicle should wait for the precedent road user to proceed.

If the road user with precedence has begun to proceed through the intersection during the determined period of time, the multi-way stop intersection precedence logic may cause the vehicle's computing devices to control the vehicle to proceed through the intersection once the road user has entered the intersection. At that point, the vehicle may be controlled to proceed, while still yielding to the road user as needed.

If after waiting the determined period of time, the other road user has not begun to proceed through the intersection, the multi-way stop intersection precedence logic may cause vehicle's computing devices to determine whether the vehicle's perception system is able to perceive the road user with precedence. This may ensure that the vehicle does not proceed through the intersection itself at a time when the road user is also proceeding through the intersection but the vehicle's perception system is unable to "see" the other road user.

The features described herein may allow for the automation of stop sign precedence behaviors for autonomous vehicles. These behaviors may enable such vehicles to assert themselves and avoid waiting for another vehicle too long (which may be uncomfortable to passengers or inconvenient and annoying to other road users) or becoming stuck. For instance, the behaviors allow autonomous vehicles to "break ties" when two vehicles arrive at a multi-way stop intersection at or very near the same time. At the same time, the vehicle avoids more dangerous and potentially unlawful behaviors, such as creeping slowly into an intersection, which can be confusing to other road users and may cause the vehicle to end up stopping partially in the intersection.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "software," "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio-visual experiences. In this regard, internal electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing devices 110 may be control computing devices of an autonomous driving computing system or incorporated into vehicle 100. The autonomous driving computing system may be capable of communicating with various components of the vehicle in order to control the movement of vehicle 100 according to the autonomous vehicle control software of memory 130 as discussed further below. For example, returning to FIG. 1, computing devices 110 may be in communication with various systems of vehicle 100, such as deceleration system 160, acceleration system 162, steering system 164, signaling system 166, planning system 168, routing system 170, positioning system 172, perception system 174, behavior modeling system 176, and power system 178 (i.e. the vehicle's engine or motor) in order to control the movement, speed, etc. of vehicle 100 in accordance with the instructions 132 of memory 130. Each of these systems may include various hardware (processors and memory similar to processors 120 and memory 130) as well as software, in order to enable these systems to perform various tasks. Again, although these systems are shown as external to computing devices 110, in actuality, these systems may also be incorporated into computing devices 110, again as an autonomous driving computing system for controlling vehicle 100.

As an example, computing devices 110 may interact with one or more actuators of the deceleration system 160 and/or acceleration system 162, such as brakes, accelerator pedal, and/or the engine or motor of the vehicle, in order to control the speed of the vehicle. Similarly, one or more actuators of the steering system 164, such as a steering wheel, steering shaft, and/or pinion and rack in a rack and pinion system, may be used by computing devices 110 in order to control the direction of vehicle 100. For example, if vehicle 100 is configured for use on a road, such as a car or truck, the steering system may include one or more actuators to control the angle of wheels to turn the vehicle. Signaling system 166 may be used by computing devices 110 in order to signal the vehicle's intent to other drivers or vehicles, for example, by lighting turn signals or brake lights when needed.

Planning system 168 may be used by computing devices 110 in order to determine and follow a route generated by a routing system 170 to a location. For instance, the routing system 170 may use map information to determine a route from a current location of the vehicle to a destination location. The planning system 168 may periodically generate trajectories, or short-term plans for controlling the vehicle for some period of time into the future, in order to follow the route to the destination. In this regard, the planning system 168, routing system 170, and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Figure 2:
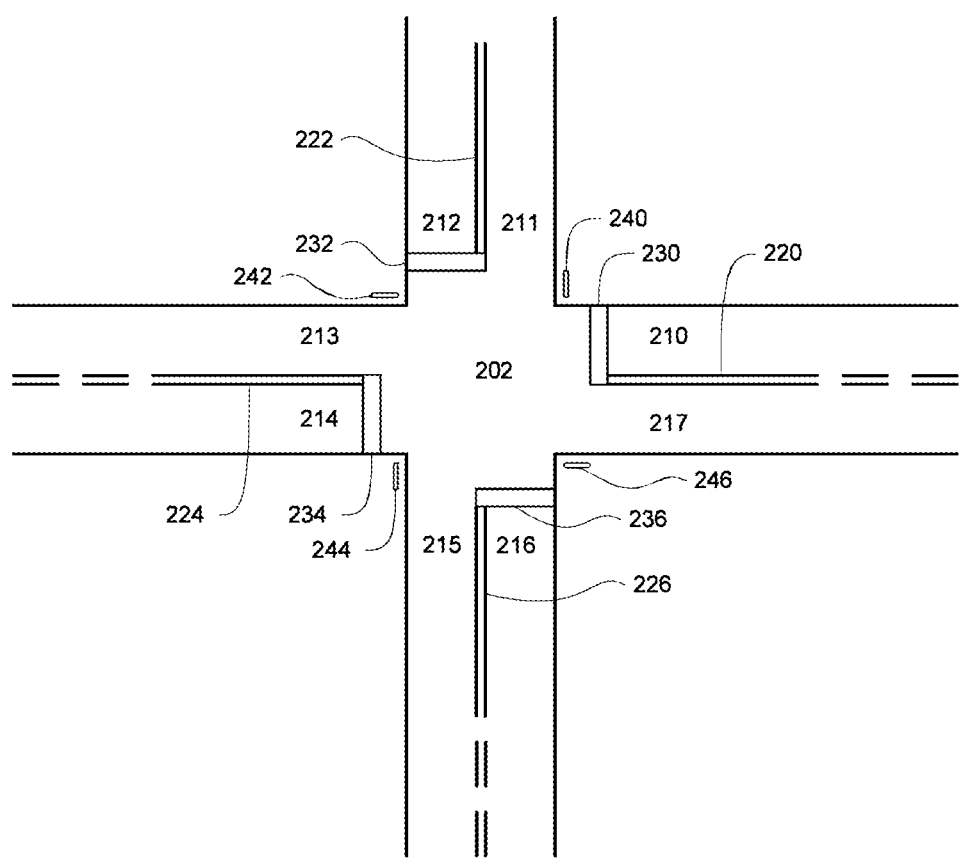
FIG. 2 is an example of map information in accordance with aspects of the disclosure.

FIG. 2 is an example of map information 200 for a section of roadway including an intersection 202. The map information 200 includes information identifying the shape, location, and other characteristics of various features including lanes 210, 211, 212, 213, 214, 215, 216, 217 defined by lane lines 220, 222, 224, 226. The map information also identifies stop lines 230, 232, 234, 236 for intersection 202 as well as traffic control devices 240, 242, 244, 246, which may include, for example, stop signs or traffic signal lights (such as flashing red lights or other types of traffic signal lights). For the purposes of this example, the traffic control devices are stop signs. In addition, the map information may include information such as which traffic control devices control which lanes of an intersection as well as flags identifying a type of the intersection. In that regard, the stop sign of traffic control device 240 may control traffic in lane 210, the stop sign of traffic control device 242 may control traffic in lane 212, the stop sign of traffic control device 244 may control traffic in lane 214, and the stop sign of traffic control device 246 may control traffic in lane 216. In addition, the intersection 202 may be associated with a flag (not represented in FIG. 2) identifying intersection 202 as a multi-way stop intersection. In some instances, in addition to or rather than identifying specific stop lines, the map information may identify a control point or location that identifies a start of an intersection with respect to a particular lane. For example, the map information 200 may also include control points (corresponding to a location at a center of each of the stop lines 230, 232, 234, and 236) for respective lanes 210, 212, 214 and 216. Although only a few features are shown and identified, the map information 200 may be highly-detailed and include various additional features.

Although the map information is depicted herein as an image-based map, the map information need not be entirely image based (for example, raster). For example, the map information may include one or more road graphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a road graph to allow for efficient lookup of certain road graph features.

Positioning system 172 may be used by computing devices 110 in order to determine the vehicle's relative or absolute position on a map or on the earth. For example, the position system 172 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 172 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing devices 110, other computing devices and combinations of the foregoing.

Figure 3:
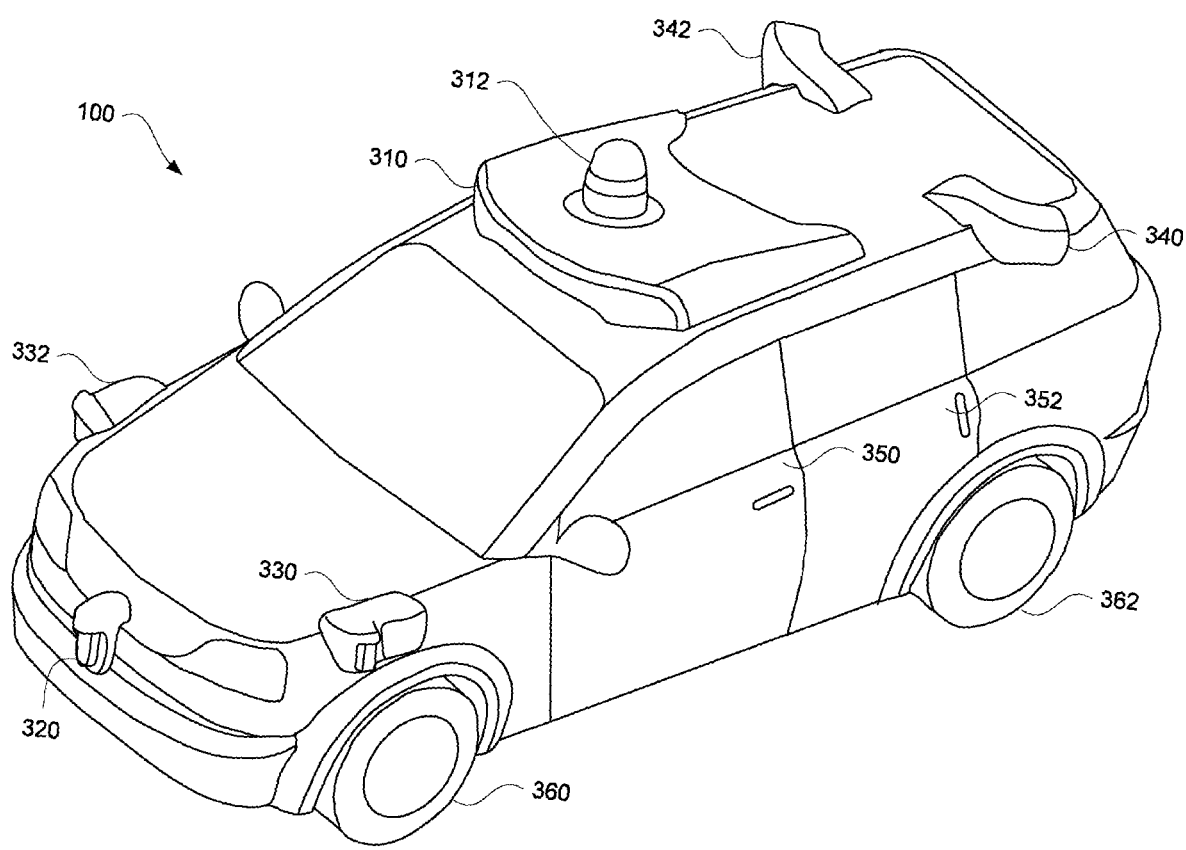
FIG. 3 is an example external view of a vehicle in accordance with aspects of the disclosure.

The perception system 174 also includes one or more components for detecting objects external to the vehicle such as other vehicles, obstacles in the roadway, traffic signals, signs, trees, etc. For example, the perception system 174 may include lasers, sonar, radar, cameras and/or any other detection devices that record data which may be processed by computing device 110. In the case where the vehicle is a passenger vehicle such as a minivan, the minivan may include a laser or other sensors mounted on the roof or other convenient location. For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 350. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310. Vehicle 100 also includes many features of a typical passenger vehicle such as doors 350, 352, wheels 360, 362, etc.

The various systems of the vehicle may function using autonomous vehicle control software in order to determine how to and to control the vehicle. As an example, a perception system software module of the perception system 174 may use sensor data generated by one or more sensors of an autonomous vehicle, such as cameras, LIDAR sensors, radar units, sonar units, etc., to detect and identify objects and their characteristics. These characteristics may include location, type, heading, orientation, speed, acceleration, change in acceleration, size, shape, etc. In some instances, characteristics may be input into a behavior prediction system software module which uses various models based on object type to output a predicted future behavior for a detected object. In other instances, the characteristics may be put into one or more detection system software modules, such as a construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may uses various models to output a likelihood of a construction zone or an object being an emergency vehicle. Detected objects, predicted future behaviors, various likelihoods from detection system software modules, the map information identifying the vehicle's environment, position information from the positioning system 172 identifying the location and orientation of the vehicle, a destination for the vehicle as well as feedback from various other systems of the vehicle (including a route generated by the routing system 170) may be input into a planning system software module of the planning system 168. The planning system may use this input to generate trajectories for the vehicle to follow for some brief period of time into the future. A control system software module of the computing devices 110 may be configured to control movement of the vehicle, for instance by controlling braking, acceleration and steering of the vehicle, in order to follow a trajectory.

The computing devices 110 may control the direction and speed of the vehicle autonomously by controlling various components. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 4:
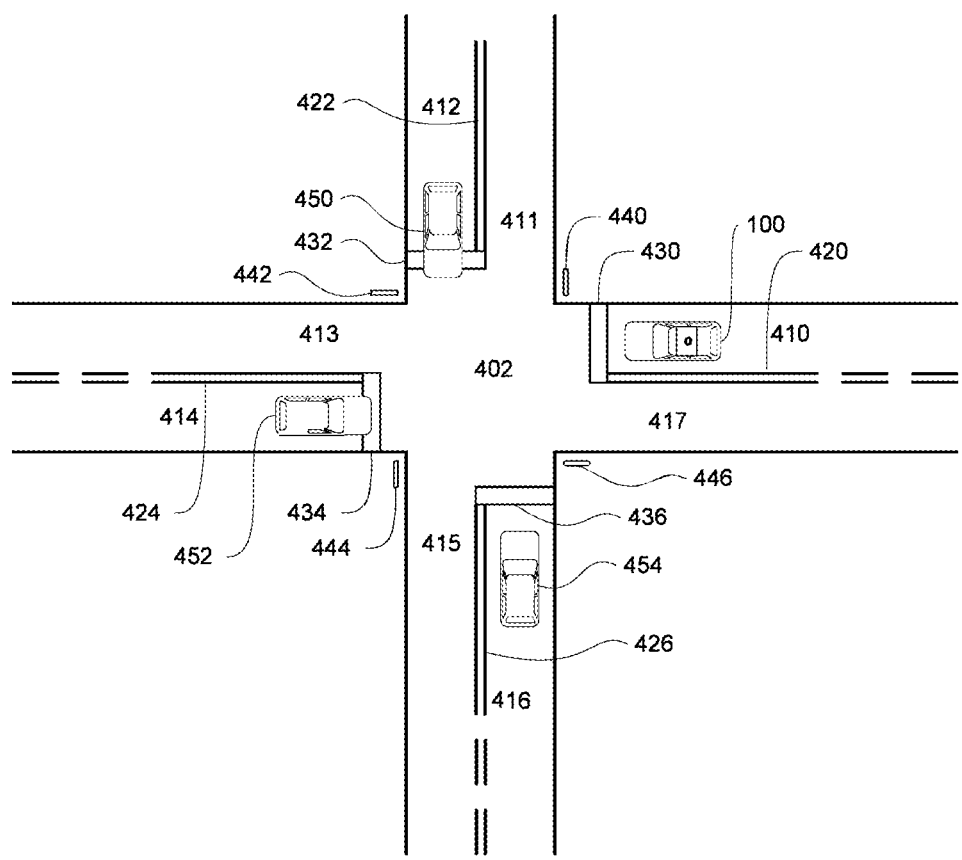
FIG. 4 is an example of a vehicle driving on a section of roadway in accordance with aspects of the disclosure.

For demonstration purposes, FIG. 4 represents vehicle 100 driving in a section of roadway 400 corresponding to the map information 200. Roadway 400 includes information identifying the shape, location, and other characteristics of various features of the map information 200. In this regard, FIG. 4 includes intersection 402 corresponding to intersection 202, lanes 410, 411, 412, 413, 414, 415, 416, 417, corresponding to lanes 210, 211, 212, 213, 214, 215, 216, 217, lane lines 420, 422, 424, 426 corresponding to lane lines 220, 222, 224, 226, stop lines 430, 432, 434, 436 corresponding to stop lines 230, 232, 234, 236, and as well as stop signs 440, 442, 444, 446 corresponding to traffic control devices 240, 242, 244, 246. In this example, vehicle 100 is located in lane 410 adjacent to the stop line 430. Other road users 450, 452, and 454 are located in lanes 412, 414, and 416, respectively.

Figure 5:
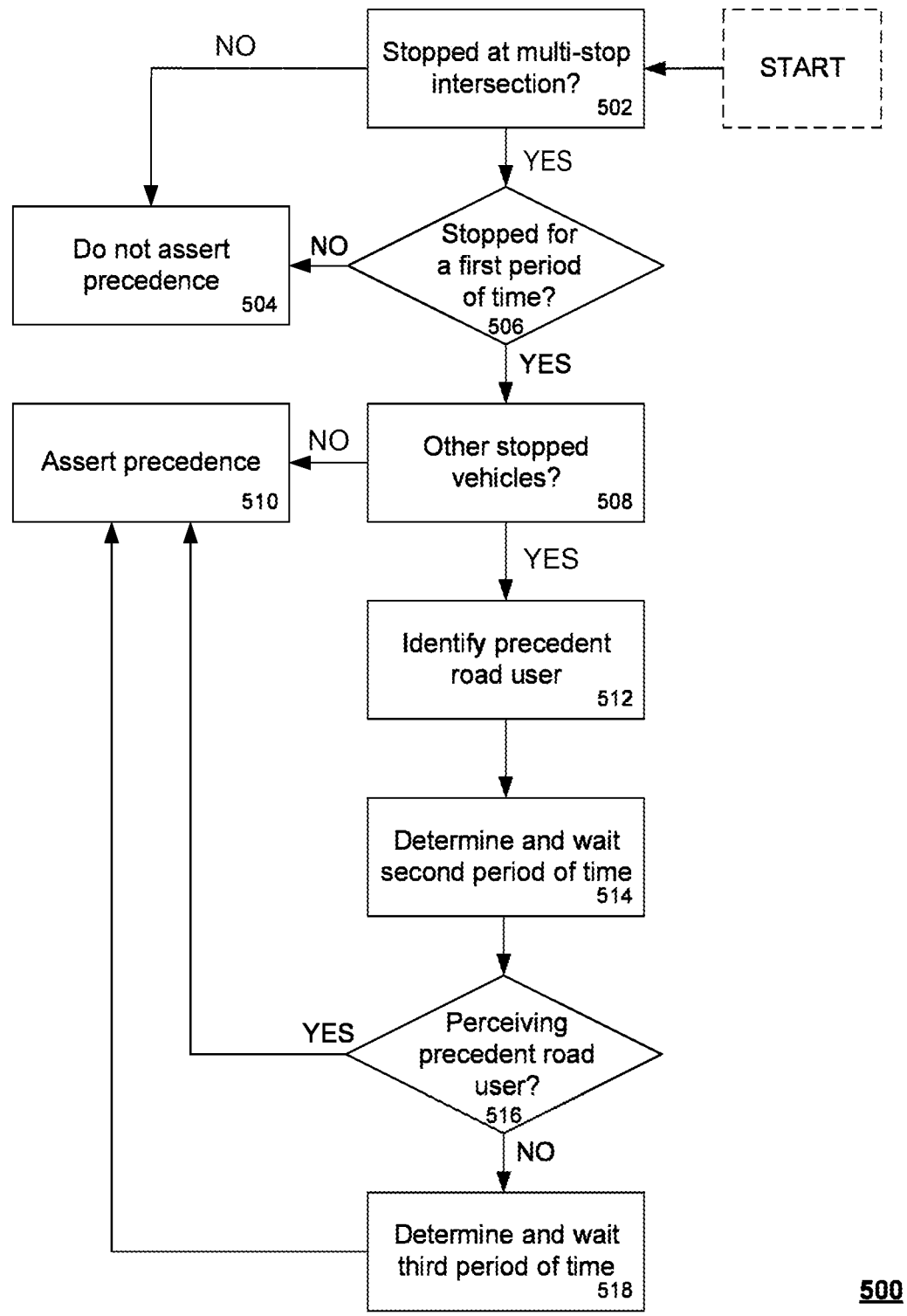
FIG. 5 is an example flow diagram in accordance with aspects of the disclosure.

FIG. 5 is an example process diagram 500 of aspects of the technology described herein for controlling a vehicle, such as vehicle 100, having an autonomous driving mode at a multi-way stop intersection, which may be performed by one or more processors of one or more computing devices of the vehicle, such as processors 120 of computing devices 110. As noted above, the vehicle 100 may be programmed with multi-way stop intersection precedence logic to assert itself in certain circumstances. Before initiating multi-way stop intersection precedence logic, the computing devices 110 may first determine when the vehicle has come to a stop at a multi-stop intersection as shown in block 502 of FIG. 5. This may be determined, for instance, by identifying information for intersections stored in the vehicle's map information. In this regard, as noted above, certain intersections, including intersection 202 corresponding to intersection 402, may be flagged as multi-way stop sign intersections. Alternatively, this may be determined by the computing devices 110 by examining the map information and/or data generated by the perception system 174, and identifying whether there are multiple stop signs for or flashing red lights controlling different lanes at an intersection.

The computing devices 110 may determine that the vehicle is stopped when certain requirements are met. For instance, these requirements may include that there is no other road user between the vehicle 100 and a stop line or control point for the lane in which the vehicle is currently traveling, and that the vehicle 100 is within a short distance from the stop line or control point (such as a few feet or more or less). As such, the computing devices 110 may also be able to determine the location of stop lines or the control point from the map information.

In some instances, coming to a stop may include moving at a speed of less than 0.1 meters per second or not moving at all relative to the ground. The vehicle's speed may be determined, for instance, using feedback from a speedometer of the vehicle, information from the planner system 174, or other mathematical approaches. Turning to the example of FIG. 4, the computing devices 110 may determine that vehicle 100 has come to a stop (i.e. is traveling at less than 0.1 meters per second) at intersection 402 as vehicle is within 2 feet of stop line 430. If the vehicle had not come to a stop, as shown in block 504 of FIG. 5, the multi-stop intersection logic would prevent the vehicle (by way of computing devices 110) from asserting precedence over other road users at the intersection.

After determining that the vehicle has come to a stop for a stop sign at a multi-stop intersection, the computing devices 110 may wait or remain stopped for a first period of time before initiating the multi-way stop intersection precedence logic as shown in block 506 of FIG. 5. The first period of time may be a fixed, predetermined period of time of 1 second or more or less. This may ensure that the vehicle comes to a full stop and waits at least some minimum amount of time before proceeding.

After waiting the predetermined period of time, the computing devices 110 may determine whether there are any other stopped vehicles at the intersection as shown in block 508, such as those that are stopped but waiting to proceed at a stop sign. For instance, the computing devices 110 may receive sensor data from the perception system 174. This sensor data may identify, among other things, the locations of any detected road users in the vehicle's environment, including, for instance, road users 450, 452, and 454. Using the sensor data, the computing devices may determine the relative locations of any detected road users with respect to the intersection as well as whether any of these detected road users are stopped at the intersection. For instance, computing devices 110 may use the sensor data to determine the locations of each of road users 450, 452, and 454 are located in lanes 412, 414, and 416, respectively, and stopped as shown in the example of FIG. 4. Again, a road user may be identified as stopped even where the road user is moving at a very slow speed such as less than 0.1 meters per second or not moving at all relative to the ground.

In certain situations, the computing devices 110 determine that there are no other road users stopped at the intersection. As such, the computing devices 110 may use multi-way stop intersection precedence logic to indicate that the vehicle 100 has precedence. The computing devices 110 may then control the vehicle 100 in order to assert precedence as shown in block 510 of FIG. 5, or in other words, to cause the vehicle to proceed through the intersection.

When the computing devices 110 determines that there is one or more other vehicle stopped at the intersection, the multi-way stop intersection precedence logic may cause the computing devices to identify a precedent road user or a road user with precedence over vehicle 100 as shown in block 512 of FIG. 5. A road user with precedence is one that has reached the intersection, and in some cases also stopped, at the same time or immediately before the vehicle. In other words, this determination is based on the arrival times of other road users at the intersection (i.e. when the other road users stopped at the intersection as described above) as well as the arrival time of the vehicle 100 at the intersection (i.e. when the vehicle 100 stopped at the intersection as described above). For example, if there is only one other road user at the intersection, and that road user has arrived at the intersection at the same time as or before the vehicle, the computing devices 110 may identify that road user as a road user with precedence.

When there are multiple other road users determined to be at or approaching the intersection, the computing devices 110 may store a queue of road users that arrive at the intersection sorted by their arrival time. In situations in which the computing devices 110 are not able to determine the arrival time for another road user, the computing devices may assign the point in time at which the perception system perceived that road user as the arrival time for that road user. This may prevent the computing devices 110 from controlling the vehicle 100 to proceed through the intersection until all other road users that have stopped at the intersection before the vehicle have proceeded.

Eventually, only one of the road users of the queue who arrived at the same time as or earlier in time than the vehicle 100 will remain at the intersection. For example, returning to FIG. 4, road user 454 may have arrived at intersection 402 before road user 452, and vehicle 100 may have arrived before road user 450. As another example, road user 454 may have arrived at intersection 402 immediately before vehicle 100 and road users 450, and 452 may have arrived at the intersection after vehicle 100. As can be understood various other circumstances are also possible.

Once only one of the road users of the queue who arrived at the intersection remain (i.e. has not yet begun to proceed through the intersection), the multi-way stop intersection precedence logic may cause computing devices 110 to determine a second period of time for how long the vehicle should wait for that road user (hereafter the precedent road user) to proceed through the intersection as shown in block 514 of FIG. 5. This may be done based on whether the precedent road user and the vehicle 100 arrived at the intersection at the same time or different times. In some instances, the computing devices may determine that the precedent road user arrived at the intersection before the vehicle 100. In such examples, the computing devices 110 may determine that the vehicle 100 should wait some predetermined period of time, such as 10 seconds or more or less, before asserting precedence as shown in block 510 of FIG. 5.

In some instances, the computing devices may determine that the precedent road user and the vehicle 100 arrived at the intersection at the same time or within some brief period of time such as within 1 second or more or less. In such cases, the computing devices may determine the relative location of the precedent road user and the vehicle 100 at the intersection. For instance, the computing devices 110 may use the sensor data from the perception system 174 to track the movements and behaviors of the precedent road user over time. The computing devices 110 may also use the sensor data to determine whether the precedent road user and the vehicle 100 arrived at the intersection at the same time and whether the road user is located to the left of, right of, or across from the vehicle at the intersection. This may be used by the computing devices 110 to determine how long the vehicle 100 should wait for the precedent road user to proceed through the intersection before asserting precedence.

For instance, when the precedent road user and the vehicle 100 arrived at the intersection at the same time and the precedent road user is located to the left of the vehicle 100 at the intersection, the computing devices 110 may determine that the vehicle 100 should wait some predetermined period of time before asserting precedence. For example, if vehicle 100 and road user 454 arrive at intersection 402 at the same time, because road user 454 is to the immediate left of vehicle 100 at the intersection, the computing devices 110 may determine that the vehicle 100 should wait 2.5 seconds or more or less before asserting precedence. In this regard, the determined period of time is shorter when the road user is located to the immediate left of the vehicle 100 than when the road user is located to the immediate right of the vehicle 100. This behavior may also be useful to situations in which two autonomous vehicles reach a multi-way stop intersection at the same time and are both using the same multi-way stop intersection precedence logic as both vehicles would wait different amounts of time before asserting precedence.

As another instance, when the precedent road user and the vehicle 100 arrived at the intersection at the same time and the precedent road user is located to the right of the vehicle 100 at the intersection, the computing devices 110 may determine that the vehicle 100 should wait another predetermined period of time before asserting precedence. For example, if vehicle 100 and road user 450 arrive at intersection 402 at the same time, because road user 450 is to the immediate right of vehicle 100 at the intersection, the computing devices 110 may determine that the vehicle 100 should wait 4 seconds or more or less before asserting precedence. In this regard, the determined period of time is longer when the road user is located to the immediate right of the vehicle 100 than when the road user is located to the immediate left of the vehicle 100. This behavior may also be useful to situations in which two autonomous vehicles reach a multi-way stop intersection at the same time and are both using the same multi-way stop intersection precedence logic as both vehicles would wait different amounts of time before asserting precedence.

As another instance, when the precedent road user and the vehicle 100 arrived at the intersection at the same time and the precedent road user is located across from the vehicle 100 at the intersection, the computing devices 110 may determine that the vehicle 100 should wait yet another predetermined period of time before asserting precedence. For example, if vehicle 100 and road user 452 arrive at intersection 402 at the same time, because road user 452 is across from the vehicle 100 at the intersection, the computing devices 110 may determine that the vehicle 100 should wait 4 seconds or more or less before asserting precedence. In this regard, the predetermined period of time is longer when the road user is across from vehicle 100 than when the road user is located to the immediate right of the vehicle 100.

In some instances, the computing devices may determine whether the precedent road user is blocked by another road user. This may be based on information including one or more expected trajectories for the precedent road user from the behavior modeling system 176. Again, as noted above, the sensor data may identify, among other things, the locations of various road users in the vehicle's environment. The computing devices 110 may use the sensor data to determine whether another road user, such as a vehicle, pedestrian or cyclist, is located within an area in front of the precedent road user, for example, blocking an expected path of the precedent road user through the intersection. This may be used by the computing devices 110 to determine how long the vehicle 100 should wait for the precedent road user to proceed through the intersection before asserting precedence. For example, when the precedent road user is blocked, for instance by another road user, the computing devices 110 may determine that the vehicle 100 should wait a further predetermined period of time of 6 seconds or more or less before asserting precedence.

If the precedent road user has begun to proceed through the intersection at any point during the second period of time, the multi-way stop intersection precedence logic may cause the computing devices 110 to control the vehicle to assert precedence, as shown in block 510 of FIG. 5, and proceed through the intersection. For instance, the precedent road user may begin to proceed through the intersection when the precedent road user begins to move forward from the stopped position or has passed the stop line or control point and has entered the intersection. For example, if a center of a bounding box representing the sensor data from the perception system corresponding to the precedent road user has moved at least 3 meters or more or less passed the stop line, control point, or start of the intersection, the precedent road user may be considered to have proceeded through the intersection. In such situations, the vehicle 100 may be controlled to proceed, while still yielding to the precedent road user as needed.

If after waiting the second period of time the computing devices 110 determine that the precedent road user has not begun to proceed through the intersection, the multi-way stop intersection precedence logic may cause the computing devices 110 to determine whether the perception system 174 is able to perceive an area around the stop line or control point where the precedent road user was observed or is likely to be as shown in block 516 of FIG. 5. If the area is visible, the precedent road user is not likely in the area because the precedent road user would have occluded the area, and the vehicle 100 can likely proceed safely. However, there is still a possibility that there could be yet another road user about to occupy the area that has not proceeded in a while, but the risk of colliding with that other vehicle would be very low when the area is visible and so, the vehicle 100 can still likely proceed safely. If the area is occluded, the vehicle 100 may wait a third period of time before proceeding as it is likely that the area is occluded by an object occupying the area. In such cases, it may be safest to wait because the precedent road user may still be occupying the area. In some instances, while the vehicle 100 is waiting at the intersection, the precedent road user may become occluded by a larger object (i.e. another passing vehicle). In such cases, it may be safest to wait longer so that the vehicle 100 and the precedent road user do not both attempt to proceed into the intersection at or proximate to the same time, and thereby avoid a potential collision. Similarly, while the vehicle 100 is waiting at the intersection, the precedent road user may become occluded by a larger object (i.e. another passing vehicle), during which time the precedent road user may have moved through the intersection, a new road user (previously behind the precedent road user) may have moved up towards the intersection occupy the area. In such cases, even though the new road user does not technically have precedence, it may still be safer to wait for the new road user as the computing devices 110 may not be able to properly distinguish the new road user from the precedent road user that has already moved.

For instance, determining whether the area is occupied may include determining whether a polygon proximate to the stop line or control point is occluded by another object (such as the precedent road user or another road user). For example, an 8-sided polygon centered at the center of the stop sign, the control point, or the start of the intersection may be drawn. If a predetermined number, such as two or more, of or percentage of sides, such as 25% or more or less, of the polygon, are not perceived by the perception system 174 of the vehicle 100, the polygon may be determined to be occluded. Similarly, if 6 or more or 75% of the sides of the polygon are perceived by the perception system 174 of the vehicle 100, the polygon may be determined to be not occluded, and thus, the vehicle 100 may proceed through the intersection (yielding to other objects as needed). For example, if the polygon is 8-sided, and the perception system 174 is only able to perceive 5 sides of polygon (e.g. less than 75% of the sides of the polygon) because such sides are not occluded by another object, the polygon may be determined to be occluded by the computing devices 110. In such cases, the vehicle 100 may wait additional time before proceeding through the intersection.

When the polygon is determined to be occluded, the multi-way stop intersection precedence logic may cause computing devices 110 to determine and wait a third period of time, as shown in block 518 of FIG. 5, before asserting precedence controlling the vehicle 100 to proceed through the intersection. This third period of time may be determined or selected based upon a type of the intersection or rather, the type of traffic control device used for the intersection. This may be determined, for instance by referring to the map information or by processing sensor data in order to identify traffic control devices proximate to an intersection. For example, if the vehicle 100 is at an intersection controlled by a flashing red light, the vehicle's computing devices may wait 40 seconds or more or less. If the vehicle 100 is at an intersection controlled by a stop sign, the vehicle's computing devices may wait 20 seconds. In this regard, the computing devices may wait longer when an intersection is controlled by a flashing red light (whether or not also controlled by stop signs) than when an intersection is controlled by a stop sign. This may ensure that the vehicle does not proceed through the intersection itself at a time when the precedent (or another) road user is also proceeding through the intersection but the perception system 174 is unable to perceive the precedent (or another) road user. In this regard, if the aforementioned polygon is determined by the computing devices 110 to be not occluded or to become not occluded during the third period of time, the computing devices 110 may control the vehicle 100 in order to assert precedence, as shown in block 510 of FIG. 5, in order to proceed through the intersection.

The features described herein may allow for the automation of stop sign precedence behaviors for autonomous vehicles. These behaviors may enable such vehicles to assert themselves and avoid waiting for another vehicle too long (which may be uncomfortable to passengers or inconvenient and annoying to other road users) or becoming stuck. For instance, the behaviors allow autonomous vehicles to "break ties" when two vehicles arrive at a multi-way stop intersection at or very near the same time. At the same time, the vehicle avoids more dangerous and potentially unlawful behaviors, such as creeping slowly into an intersection, which can be confusing to other road users and may cause the vehicle to end up stopping partially in the intersection.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of controlling a vehicle having an autonomous driving mode at a multi-way stop intersection, the method comprising:
   identifying, by one or more processors, at least one road user at the intersection;
   determining, by the one or more processors, a period of time to wait for the at least one road user to proceed through the intersection based on whether the at least one road user is blocked by another road user;
   after waiting the determined period of time, determining, by the one or more processors, that the at least one road user has not begun to proceed through the intersection;
   determining, by the one or more processors, whether the vehicle is able to perceive the at least one road user based on whether a polygon corresponding to a location proximate to the intersection is occluded, wherein the polygon is determined to be occluded when a predetermined number of sides of the polygon are not perceived by the vehicle; and
   based on the determination that the at least one road user has not begun to proceed through the intersection and a determination that the vehicle is able to perceive the at least one road user, controlling, by the one or more processors, the vehicle in the autonomous driving mode to proceed through the intersection.

2. The method of claim 1, wherein, when the at least one road user is blocked by the other road user, the other road user is located in an area in front of the at least one road user such that the other road user blocks an expected path of the at least one road user.

3. The method of claim 1, wherein the other road user is a vehicle, pedestrian or cyclist.

4. The method of claim 1, further comprising, before determining the period of time, waiting a predetermined period of time.

5. The method of claim 1, further comprising, identifying the at least one road user as a road user with precedence relative to the vehicle at the intersection.

6. The method of claim 5, wherein identifying the at least one road user as the road user with precedence includes determining that the at least one road user has arrived immediately before the vehicle at the intersection or within at least a predetermined period of time of an arrival of the vehicle at the intersection.

7. The method of claim 5, wherein, when there are multiple road users at the intersection, identifying the at least one road user as the road user with precedence is based on arrival times of the multiple road users at the intersection.

8. The method of claim 1, wherein determining the period of time is further based on arrival times for the vehicle and the at least one road user at the intersection.

9. The method of claim 1, wherein when it is determined that the vehicle is not able to perceive the at least one road user, waiting an additional period of time before controlling the vehicle.

10. The method of claim 9, further comprising determining the additional period of time based on whether the intersection is controlled by stop signs.

11. The method of claim 9, further comprising determining the additional period of time based on whether the intersection is controlled by a flashing traffic light.

12. The method of claim 9, further comprising determining the additional period of time to be a first period of time when the intersection is controlled by stop signs and a second period of time when the intersection is controlled by a flashing traffic light, and wherein the second period of time is longer than the first period of time.

13. A system for controlling a vehicle having an autonomous driving mode at a multi-way stop intersection, the system comprising one or more processors configured to:
identify at least one road user at the intersection;
determine a period of time to wait for the at least one road user to proceed through the intersection based on whether the at least one road user is blocked by another road user;
after waiting the determined period of time, determine that the at least one road user has not begun to proceed through the intersection;
determine whether the vehicle is able to perceive the at least one road user based on whether a polygon corresponding to a location proximate to the intersection is occluded, wherein the polygon is determined to be occluded when a predetermined number of sides of the polygon are not perceived by the vehicle; and
based on the determination that the at least one road user has not begun to proceed through the intersection and a determination that the vehicle is able to perceive the at least one road user, control the vehicle in the autonomous driving mode to proceed through the intersection.

14. The system of claim 13, wherein, when the at least one road user is blocked by the other road user, the other road user is located in an area in front of the at least one road user such that the other road user blocks an expected path of the at least one road user.

15. The system of claim 13, wherein the other road user is a vehicle, pedestrian or cyclist.

16. The system of claim 13, wherein the determination of the period of time is further based on arrival times for the vehicle and the at least one road user at the intersection.

17. The system of claim 13, wherein when it is determined that the vehicle is not able to perceive the at least one road user, the one or more processors are further configured to wait an additional period of time before controlling the vehicle.

18. The system of claim 17, wherein the one or more processors are further configured to determine the additional period of time based on whether the intersection is controlled by stop signs.

19. The system of claim 17, wherein the one or more processors are further configured to determine the additional period of time based on whether the intersection is controlled by a flashing traffic light.

20. The system of claim 17, wherein the one or more processors are further configured to determine the additional period of time to be a first period of time when the intersection is controlled by stop signs and a second period of time when the intersection is controlled by a flashing traffic light, and wherein the second period of time is longer than the first period of time.

* * * * *